Aug. 9, 1938.　　　W. H. MARTIN　　　2,126,490
WELDING APPARATUS
Filed Nov. 11, 1936　　　3 Sheets-Sheet 1

Inventor
William H. Martin
By [signature]
Attorney

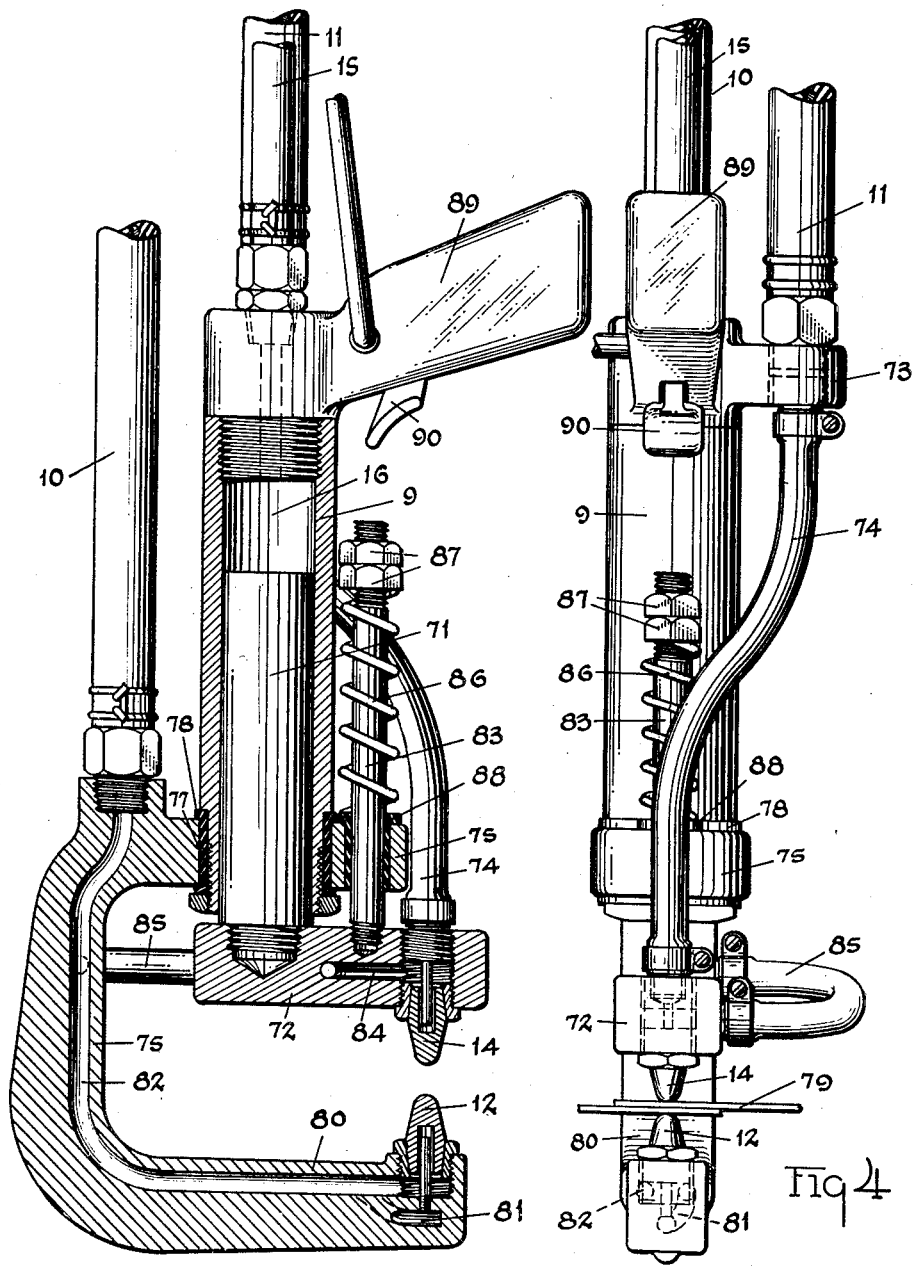

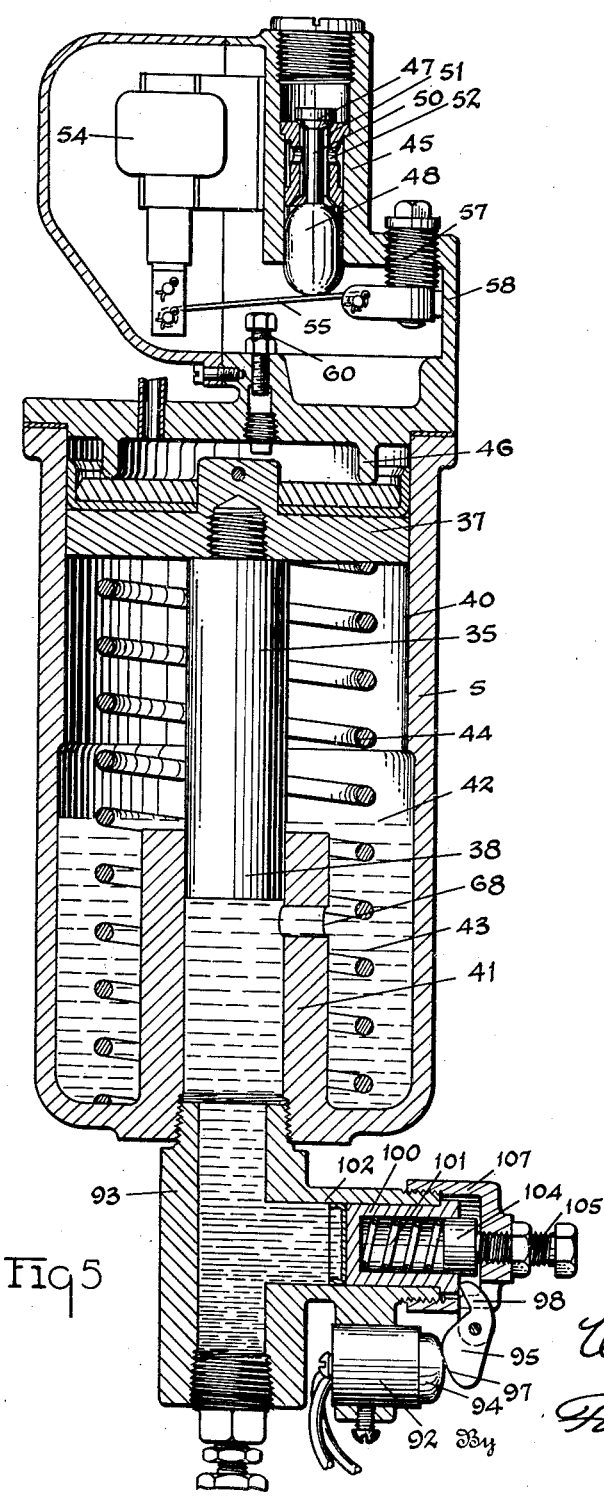

Patented Aug. 9, 1938

2,126,490

UNITED STATES PATENT OFFICE 2,126,490

WELDING APPARATUS

William H. Martin, Detroit, Mich.

Application November 11, 1936, Serial No. 110,358

13 Claims. (Cl. 219—4)

My invention has for its object to produce a welding apparatus wherein the welding pressure is produced hydraulically to eliminate the impacts of hammer-like blows elastically produced in pneumatically operated welders. As is well known, the welding points in pneumatically operated welders quickly mushroom and shorten which necessitates frequent replacement of the welding points and results in loss of the welding time.

The invention also provides a booster structure for boosting the pneumatic pressure and converting it into a hydraulic pressure to enable reduction of weight of the manually manipulated welders by the use of smaller cylinders and pistons that will produce the same pressure as the pneumatically operated welders as well as eliminate the hammering of the welder points and also the rebound of the movable welder points that often occurs in pneumatically operated welders.

The invention consists in other features which will appear from the following description and upon examination of the drawings. Structures containing the invention may partake of different forms and may be varied in their details and still embody the invention. To illustrate a practical application of the invention, I have selected a welding apparatus as an example of the various structures that contain the invention and shall describe the selected structure hereinafter, it being understood that certain features of my invention may be used to advantage without a corresponding use of other features of the invention and without departing from the spirit of the invention as presented in the claims. The particular structure is shown in the accompanying drawings.

Figure 1:
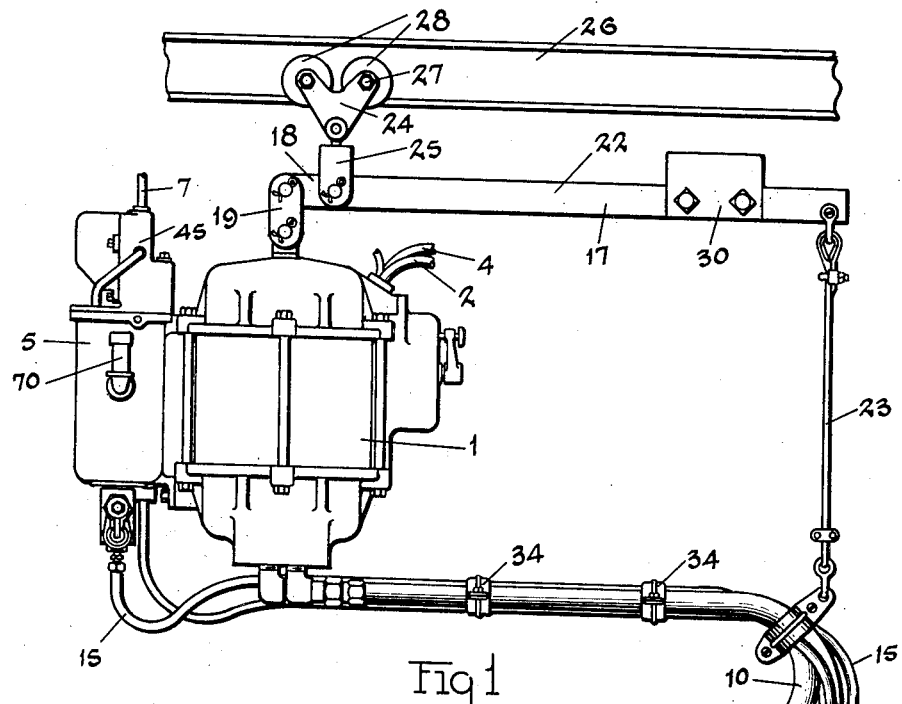
Figure 2:
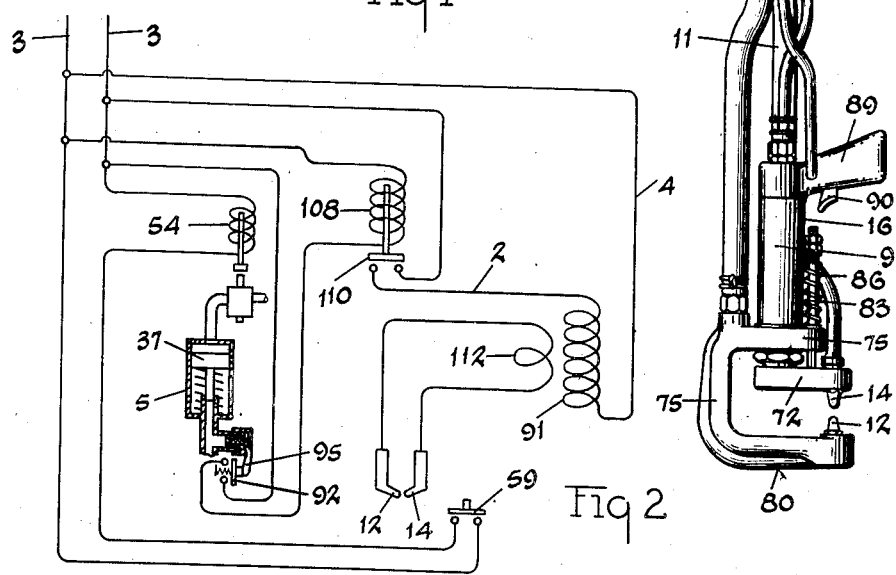

Fig. 1 illustrates the particular welding apparatus selected. Fig. 2 illustrates a diagram of the electric connections of the welding apparatus illustrated in Fig. 1. Fig. 3 illustrates a view of a longitudinal section of the form of welder shown in Fig. 1. Fig. 4 illustrates a side view of the welder. Fig. 5 illustrates a booster for operating the welder.

The apparatus comprises a source of supply of an electric current that is transformed by a transformer to produce the welding current, a source of supply of air subjected to pressure that is boosted by a booster and transmitted hydraulically to produce the welding pressure, and a source of supply of a cooling liquid for cooling the parts of the apparatus heated by the flow of the welding current.

A transformer 1 is connected to the source of supply of electric current, such as the main lines 3 of a commercial circuit, through current controlling elements by conductors 2 and 4, and a booster 5 is connected to the source of supply of air under pressure by a suitable pipe 7. The secondary of the transformer 1 is preferably formed of a hollow conductor electrically connected to the welder 9 through hollow flexible conductor cables 10 and 11 and parts of the welder 9 to the welder terminals or welding points 12 and 14. The pneumatically operated booster 5 is connected by a flexible substantially non-expansible tube 15 to the cylinder 16 of the welder 9 which are filled with a liquid to hydraulically transmit the increased pressure to the welder without rebound and with a steady constant movement to produce the required welding pressure on the work in a small light weight cylinder.

The welding apparatus may be supported by means of a swivel supported lever 17 having a short arm 18 and a long arm 22. Preferably the transformer 1 and the booster 5 are mechanically connected to form a unitary structure that is connected by the short link 19 to the end of the short arm 18, and the welder and the end parts of the cables are connected to the end of the longer arm 22 by a strap or wire 23. The lever is connected to a carriage 24 by a swivel joint 25. The carriage 24 is supported on the I-beam 26. The carriage is provided with stub axles or pins 27 on which are rotatably supported the rollers 28 located on opposite sides of the web of the I-beam 26. The rollers 28 move on the lower flange of the I-beam 26 in the manner well known in the art. The weight of the transformer and the booster is counterbalanced by a counterbalancing weight 30 that may be adjustably connected to the longer arm 22.

Water or other cooling liquid, that is passed through the parts of the apparatus through which the welding current flows, may be directed to any suitable point in the circuit and caused to flow through the secondary, the hollow electric cables, and the welder terminals or welding points and returned to a point of discharge or to a reservoir in order to produce a continuous flow of the liquid. Also the electric cables are preferably bound together by means of clamps 34 to prevent spreading by electric repulsion.

The booster 5 is provided with a two-part or double-headed piston member 35. Preferably one part or head of the piston member 35 has ten or twelve times the area of the other head or part of the piston member in order to multiply the per square inch pressure of the air. The two-part piston member is located in a cylinder member having a pneumatic cylinder part 40 and a hydraulic cylinder part 41. The piston part 37 having the larger diameter is located in the pneumatic cylinder part 40 that forms an enclosing shell. The piston part 38 having the smaller diameter is located in a hydraulic cylinder part 41 that protrudes upwardly into the shell from its lower end to form in the lower part of the booster an annular chamber or reservoir 42 for containing a liquid 43, such as oil and glycerine compositions, etc., suitable for hydraulic transmission of pressures. A spring 44 of relatively light reacting pressure is disposed within the booster 5 to resiliently bias the piston member 35 to its uppermost position in the booster. The upper end of the booster has a depending flange 46 that operates as a stop to the upward movement of the piston member 35 by the operation of the spring 44. The spring is located intermediate the piston part 37 and the bottom of the booster shell and operates to raise the piston member 35 to its normal position when the pressure on the part 37 is sufficiently reduced.

The flow of the air to the booster is controlled by the electro-magnetically operated valve 45. The valve 45 is provided with a pair of heads 47 and 48 that are connected together by means of a stem 50 located in a sleeve 51. The heads 47 and 48 seat on the ends of the sleeve 51 to close and open the ends of the sleeve. The sleeve 51 is provided with openings 52 located intermediate its ends. The pressure of the air operates to normally maintain the head 47 in a closed position and the head 48 in an open position. When the head 47 is moved to its open position, the head 48 is moved to its closed position, and the air moves through the openings 52 into the upper booster cylinder. The cylinder is exhausted upon reversal of movement of the movable member of the valve. The valve is opened to connect the booster with the source of supply of air by means of a solenoid 54 operating through the lever 55 pivotally supported on a screw 57 that is threaded through the wall of the housing 58 that encloses the valve parts. The screw may be rotated to adjust the positions of the lever 55 to produce the desired limited opening movement of the valve.

The solenoid 54 is connected in a circuit that may be closed by a push-button or switch 59 conveniently located on the welder for manipulation by the operator to energize the solenoid 54 to operate the lever 55. Upon deenergization of the solenoid 54, the pressure of the air from the source causes the head 47 to close the connection to the source of supply of air and open the connection of the booster to the atmosphere to exhaust the air from the booster as the piston 35 is returned by the spring 44. The downward movement of the solenoid and the lever 55 may be limited by means of the screw 60 that is threaded into the wall of the housing 58.

When the circuit of the solenoid 54 is closed by the switch 59, the pressure produced by the air on the piston part 37 is transmitted to the part of the liquid 43 located in the cylinder part 41 to multiply the effective per square inch pressure. The maximum controllable air pressure exerted through flexible pipes for slow welding is limited to about eighty or ninety pounds per square inch pressure on the welder piston which requires exceedingly large cylinders and pistons in the welder, but by the use of the booster and hydraulic transmission, a small cylinder and piston can be used in the welder to produce a pressure of a thousand or more pounds per square inch and enable rapid welding.

Thus, by my invention, I have provided an exceedingly efficient pneumatically operated welding apparatus to which air is supplied at a pressure that enables prompt pneumatic response of a piston to a pressure control valve and the pressure of the air is magnified to produce greatly increased hydraulic pressure which is transmitted by liquid to a manually supported and manipulated welder and by reason of the high pressure per square inch may be provided with a smaller cylinder and piston and, consequently, may be of relatively light weight to enable ease of manual manipulation and efficient welding operations without rebound or hammering of the welding point. Also, by supporting the heavy parts of the apparatus, such as the transformer and the pneumatic hydraulic booster, on the end of the short arm of a lever swiveled to a carriage, by a means that will dispose the heavy parts close to the point of connection of the lever to the carriage and connecting the light weight welder by a flexible cable to the end of the long arm of the lever and also connecting the welder by relatively short electric conductors and to the booster by a relatively short pipe, the connected parts are maintained in substantially fixed relation as the apparatus is conveyed by the carriage and the welder is raised or lowered about the horizontal axis of the swivel and swung laterally about the vertical axis of the swivel. Material flexing of the conductors or the pipe is eliminated. There is, thus, produced mobility of the apparatus as a whole and freedom of manipulation of the welder since resistance to movements of the welder by the connecting parts of the apparatus is largely eliminated.

The cylinder 16 of the welder has preferably an interior diameter substantially the same as that of the interior diameter of the cylinder 41 of the booster. At a point located below the level of the liquid 43 in the reservoir 42 and below the piston part 38 when the piston member 35 is in its uppermost position in the booster, an opening 68 is formed in the wall of the cylinder 41 through which the interior of the cylinder 41 communicates with the reservoir 42 and, consequently, the part of the cylinder 41 below the piston part 38 is maintained full of the liquid 43 at all times, notwithstanding any loss of the liquid that might occur by the escape at points intermediate parts of the apparatus. The reservoir may be filled to the desired level through a suitable breather opening provided by the short breather pipe 70 which opens into the shell of the booster at a point above the level of the liquid in the reservoir. The breather affords a means for preventing a counter pressure by air that would be otherwise trapped intermediate the liquid in the reservoir and the piston part 37. It maintains atmospheric pressure above the level of the liquid in the reservoir. When the piston 35 descends under the pressure of the air from the source of supply as controlled by the valve 45, the piston head 37 closes the opening 68 to entrap and confine the liquid located in the cylinder 41, the pipe 15, and the cylinder 16 of the welder and on its continued movement past the opening 68, it actuates the piston located in the cylinder 16.

The piston 71 of the welder has a laterally extending arm 72. The welding point 14 is connected to the outer end part of the arm 72. The welder is also provided with a boss 73 that protrudes from one side of the welder. The hollow electric cable 11 is connected to the boss 73, and the current flows from the electric cable 11 through the boss 73, the wall of the cylinder, the piston 71, the arm 72, and to the welding point 14. The boss has an opening therethrough that communicates with the interior of the cable 10 and with a pipe 74. The cooling liquid that is circulated through the cable 11 passes through the pipe 74 to the arm 72 and into the cavity formed in the welding point 14, in the manner well known in the art, to maintain the welding point cool. The welder 9 is also provided with a bracket 75 to which is connected the hollow electric cable 10. The bracket 75 is insulatingly supported on the welder by means of suitable bushings and washers 77 and 78 to electrically insulate the bracket from the cylinder wall of the welder. The bracket 75 is provided with an arm 80 located in opposed relation to the arm 72, and the welding point 12 is connected to the outer end of the arm 80 and in opposed relation to the welding point 14.

The bracket 75 is provided with suitable passageways 81 and 82 that lead to and from the interior of the welding point 12. The arm 72 has a passageway 84 that is connected through a flexible pipe 85 with the passageway 81 to conduct the cooling liquid from the welding point 14 to the welding point 12. The cooling liquid then passes from the welding point 12 to and through the passageway 82 and the hollow electric conductor 10 back to the transformer 1. When the piston 71 of the welder is operated to clamp the work 79 between the welding points 12 and 14, the primary circuit of the transformer is completed by a switch automatically operated when the pressure on the work is above the required welding pressure to produce flow of the welding current in the circuit of the secondary, which includes the welding point and the work, and thereby produces the weld. In order to insure a high contact pressure and low conductivity as between the piston 71 and the wall of the cylinder to the welder 9 to which the conductor 11 is connected, the pressure of the welding point 14 against the work produces a large torque due to the location of the welding point 14 remote from the axis of the piston and the eight hundred or thousand pound pressure that the piston 71 is subjected to. The torque produces a high lateral pressure on the ends of the piston against the wall of the cylinder and a corresponding high conductivity.

The welder terminals are maintained in alignment by means of a rod 83 that is slidably and insulatingly supported in a laterally protruding part of the bracket 75. The rod 83 is insulated from the bracket 75 by a suitable insulating bushing 88. To cause the return of the piston 71 upon release of the pressure in the cylinder the welder 9 is provided with a spring 86 that is located on the rod 83. The spring 86 is located intermediate a pair of adjustable nuts 87 and the insulating bushing 88 for returning the piston 71 and separating the welding points 12 and 14 upon the completion of the weld.

The welder may be provided with a handle 89 which has a suitable trigger 90 for operating the switch 59 to initiate the cycle of operation of the welding apparatus and produce closure of the circuit of the primary coil 91 and the flow of the welding current in the circuit of the secondary when the pressure of the welder terminals on the work reaches a proper welding pressure.

The flow of the welding current is controlled by means of a pressure switch 92 supported on a connector or fixture 93 that connects the pipe 15 to the booster 5. The switch 92 has a plunger 94 that may be suitably spring pressed to bias the switch to an open position in the manner well known in the art. The plunger 94 is operated by a lever 95 having a cam shaped part 97 that engages an end of the plunger 94 and a finger 98 that is engaged by a piston 100. The piston 100 is located in a cylinder 102 that protrudes laterally from the fixture 93 and communicates with the passageway that connects the cylinder 41 of the booster 5 with the pipe 15 and is moved by the pressure which is transmitted through the liquid 43 from the booster to the cylinder of the welder.

A spring 101 is located intermediate the end of the hollow piston 100 and head 104 formed on a screw 105 that is threaded into a cap 107 located on the outer end of the cylinder part 102 of the fixture. The lever 95 is pivotally supported on the cap 107. The screw 105 may be adjusted to adjust the spring to produce a counter pressure on the liquid 43 to prevent operation of the switch 92 by the piston 100 until the pressure produced by the pressure on the liquid 43 by the piston head 38 rises to such a degree as will produce a desired welding pressure by the welding points 12 and 14 on the work 79. The switch 92 then closes a circuit through the solenoid 108 from the source of supply of electric current that operates the switch 110 located in the circuit of the primary 91 which inductively causes the flow of the welding current through the secondary 112, the welding points 12 and 14, and the work.

I claim:

1. In a welding apparatus, a manually supportable welder having a welder cylinder and a welder piston, a welding point mechanically connected to and operated by the piston for engaging the work, a cylinder member having two cylinder parts, means for supporting the cylinder member, a piston member having two piston parts movable in said cylinder parts, a source of supply of air under pressure connected to the cylinder member, a valve for controlling the supply of air to one of the cylinder parts to produce pneumatic pressure upon one of the piston parts, a flexible substantially non-expansible pipe having one end communicating with the other of the said cylinder parts and the other end communicating with the said welder cylinder, means for maintaining the spaces intermediate the said other of the piston parts and the welder piston within the said other cylinder part and the welder cylinder and the flexible pipe substantially filled with a liquid, an electromagnetic means for operating the said valve, a source of supply of electric current, a switch located on the welder for connecting the said electromagnetic means to the source of electric current for operating the valve, a transformer connected to the source of current and having a secondary for producing a welding current, means for supporting the transformer, means including a flexible conductor for connecting the secondary to the work and the welding point, and means operated according to the pressure exerted by the welding point on the work for causing the flow of a welding current through the welding point and the work.

2. In a welding apparatus, a manually supportable welder having a welder cylinder and a welder piston, a welding point connected to the piston for engaging the work, a cylinder member having two cylinder parts, a piston member having two piston parts movable in said cylinder parts, a source of supply of air under pressure connected to the cylinder member, a valve for controlling the supply of air to one of the cylinder parts to produce pneumatic pressure upon one of the piston parts, a flexible substantially non-expansible pipe having one end communicating with the other of the said cylinder parts and the other end communicating with the said welder cylinder, the said other of the cylinder parts having a port located at one end of the said other of the cylinder parts and opened and closed by the said other of the piston parts, a reservoir for containing a liquid communicating with the said other of the cylinder parts through the said port and operative to maintain the spaces intermediate the said other of the piston parts and the welder piston within the said other cylinder part and the welder cylinder and the flexible pipe filled with a liquid, an electromagnetic means for operating the said valve, a source of supply of electric current, a switch located on the welder for connecting the said electromagnetic means to the source of electric current for operating the valve, a transformer connected to the source of current and having a secondary for producing a welding current, means for supporting the cylinder member and the transformer, means including a flexible conductor for connecting the secondary to the work and the welding point, and means operated according to the pressure exerted by the welding point on the work for causing the flow of a welding current through the welding point and the work.

3. In a welding apparatus, a manually supportable welder having a welder cylinder and a welder piston, a welding point connected to the piston for engaging the work, a cylinder member having two cylinder parts, a piston member having two piston parts movable in said cylinder parts, a source of supply of air under pressure, a valve for controlling the supply of air to one of the cylinder parts to produce pneumatic pressure upon one of the piston parts, a flexible substantially non-expansible pipe having one end communicating with the other of the said cylinder parts and the other end communicating with the said welder cylinder, the cylinder member having a reservoir for containing a liquid surrounding the said other of the cylinder parts, the said other of the cylinder parts having an opening near its upper end for communication with the said reservoir, the said other of the piston parts operative to close the said opening when actuated by the pressure of the air and to open the said opening when released from the pressure of the air for maintaining the spaces intermediate the said other of the piston parts and the welder piston within the said other cylinder part and the welder cylinder and the flexible pipe filled with a liquid, an electromagnetic means for operating the said valve, a source of supply of electric current, a switch located on the welder for connecting the said electromagnetic means to the source of electric current for operating the valve, a transformer connected to the source of current and having a secondary for producing a welding current, means for supporting the cylinder member and transformer, means including a flexible conductor for connecting the secondary to the welding point and the work, and means operated according to the pressure exerted by the welding point on the work for causing the flow of a welding current through the welding point and the work.

4. In a welding apparatus, a manually supportable welder having a welder cylinder and a welder piston, a welding point connected to the piston for engaging the work, a cylinder member having two cylinder parts, a piston member having two piston parts movable in said cylinder parts, a source of supply of air under pressure, a valve for controlling the supply of air to one of the cylinder parts to produce pneumatic pressure upon one of the piston parts, a flexible substantially non-expansible pipe having one end communicating with the other of the said cylinder parts and the other end communicating with the said welder cylinder, means for maintaining the spaces intermediate the said other of the piston parts and the welder piston within the said other cylinder part and the welder cylinder and the flexible pipe filled with a liquid, an electromagnetic means for operating the said valve, a source of supply of electric current, a switch located on the welder for connecting the said electromagnetic means to the source of electric current for operating the valve, a transformer connected to the source of current and having a secondary for producing a welding current, means including a flexible conductor for connecting the secondary to the welding point and the work, a switch cylinder communicating with the said spaces, a switch piston located in the switch cylinder and operated by the pressure of the liquid, means for yieldingly resisting the movement of the piston, and a switch operated by the piston when the pressure of the liquid reaches an amount to produce a predetermined pressure of the welding point on the work to cause the flow of a welding current through the welding point and the work.

5. In a welding apparatus, a welder having a welding terminal and a piston and cylinder for operating the welding terminal, a pressure device, means for operating the pressure device to produce pulsating pressures, a pipe for connecting the pressure device with the cylinder of the welder, the communicating spaces in the pipe, the cylinder and the pressure device substantially filled with a liquid for hydraulically transmitting the pressure from the pressure device to the cylinder for operating the piston and cylinder of the welder one relative to the other, a pressure means communicating with the said pipe and operated by the pressure of the liquid, a source of supply of electric current, a switch operated by the pressure means to cause the flow of the welding current through the welding terminal and the work, and a resilient means for resisting the operation of the switch and means for varying the pressure of the resilient means to vary the periods of flow of the welding current relative to the welding pressure periods and to vary the periods of welding pressure relative to the pressure periods produced by the pulsating pressure device.

6. In a welding apparatus, a cylinder and piston, means for reciprocating the piston, a manually portable welder, the welder having a cylinder and piston, welder terminals mechanically connected to the cylinder and the piston of the welder, a flexible tube interconnecting the cylinders, means for directing a liquid into the spaces between the pistons and entrapping the liquid therein for hydraulically transmitting pressure from the first-named piston to the second-named piston, a transformer, means for supporting the transformer, a pair of electric conductors connecting the secondary of the transformer with the welder terminals, a pressure switch actuated by the pressure of the said liquid in the cylinders to produce flow of the welding current through the conductors, the welder terminals, and the work, a resisting means for resisting the movement of the switch by the pressure of the said liquid, and means for adjusting the resisting means to vary the pressure transmitted to the welder terminals and to vary the welding pressure period and the period of flow of the welding current relative to the rise and fall of the pressure produced by the reciprocation of the first-named piston.

7. In a welder, a piston and a cylinder, a welder terminal operated by the pressure in the cylinder and electrically connected to the piston, means for producing a high electric contact pressure of the piston against the cylinder, and means for producing the flow of the welding current through the cylinder wall, the piston, and the welder terminals.

8. In a welder, a piston and a cylinder, a welder terminal operatively connected to the piston and operated by the pressure in the cylinder, means for electrically connecting the welder terminal to the piston, means operated by the pressure of the welder terminal on the work for producing a lateral electric contact pressure of the piston against the wall of the cylinder, and means for producing flow of a welder current through the cylinder wall, the piston, and the welder terminal.

9. In a welder, a piston and a cylinder, a welder terminal connected to the piston, the work-engaging end of the welder terminal located ex-axially with respect to the axis of the piston and cylinder for producing a high contact pressure between the piston and the cylinder wall when the welder terminal engages the work, and means for causing the flow of the welding current through the cylinder wall, the piston, and the welder terminal.

10. In a welding apparatus, a pressure means having a cylinder and a piston, means for operating the piston, a welder having a welder cylinder and a welder piston, a welder terminal connected to the piston, a flexible pipe connecting the said cylinders, a source of welding current, the cylinder, the piston and the welder terminal located in the circuit of the said source of current, a source of supply of liquid, means for directing the liquid into the cylinder of the pressure means, the pipe and the welder cylinder, means operated by the pressure means for entrapping the liquid in the pipe and the spaces of the cylinders connected by the pipe for transmitting pressure from the piston of the pressure means to the welder piston, and means controlled according to the pressure of the liquid in the pipe for producing flow of the welding current through the cylinder, the piston and the welder terminal when the welder terminal engages the work.

11. In a welder, a cylinder and a piston, a welder terminal connected to the piston, an electric conductor connected to the cylinder and through the cylinder, the piston, and the welder terminal to the work, means for producing a high contact pressure of the piston against the cylinder wall when the welder terminal engages the work, a second conductor, means for electrically connecting the second conductor to the work, a tube connected to the cylinder for transmitting fluid pressure to the cylinder to operate the piston to press the terminal against the work, and means for causing flow of the current through the cylinder wall and the piston to the welder terminal and the work upon rise of pressure of the fluid subsequent to the engagement of the work by the welder terminal.

12. In a welder, a cylinder and a piston, arms connected to the cylinder and piston, welder terminals located ex-axially with respect to the axis of the cylinder and supported on and electrically connected to the said arms for engaging the work and producing a high contact pressure of the piston against the wall of the cylinder, a pair of conductors, one electrically connected to the cylinder and through the cylinder and piston and the arm supported on the piston to one of the welder terminals, the other of the conductors connected through the other of the said arms to the other of the welder terminals, a source of supply of fluid pressure, means for connecting the cylinder to the said source for operating the piston, a source of current, and means causing flow of the current through the cylinder and piston to the welder terminals when the terminals engage the work.

13. In a welder, a cylinder and a piston, a welder terminal connected to the piston, a tubular member connected to the cylinder and containing a liquid, means for hydraulically operating the piston by pressures transmitted through the liquid in the tubular member and pressing the piston against the cylinder wall when the terminal engages the work, a tubular electric conductor electrically connected to the cylinder and through the cylinder and piston to the welder terminal connected to the piston, the welder having a tubular part interconnecting the tubular conductor and the welder terminal, means for circulating a cooling liquid through the electric conductor, the tubular part and the terminal, and means for causing flow of a welding current through the conductor, the wall of the cylinder, the piston and the work when the terminal engages the work.

WILLIAM H. MARTIN.